US012694017B2

(12) United States Patent
Xian et al.

(10) Patent No.: US 12,694,017 B2
(45) Date of Patent: Jul. 28, 2026

(54) METHOD, APPARATUS, DEVICE AND STORAGE MEDIUM FOR INFORMATION RETRIEVAL

(71) Applicant: Beijing Zitiao Network Technology Co., Ltd., Beijing (CN)

(72) Inventors: Junli Xian, Beijing (CN); Jie Mei, Beijing (CN); Junan Chen, Beijing (CN); Zhenfei Luo, Beijing (CN); Mian Liu, Beijing (CN); Hailong He, Beijing (CN); Wei Dong, Beijing (CN); Mo Huang, Beijing (CN); Guoxuan Zhu, Beijing (CN); Peng Wu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/955,568

(22) Filed: Nov. 21, 2024

(65) Prior Publication Data

US 2025/0165464 A1     May 22, 2025

(30) Foreign Application Priority Data

Nov. 21, 2023    (CN) .......................... 202311559495.7

(51) Int. Cl.
*G06F 7/00* (2006.01)
*G06F 16/242* (2019.01)
*G06F 16/248* (2019.01)

(52) U.S. Cl.
CPC .......... *G06F 16/243* (2019.01); *G06F 16/248* (2019.01)

(58) Field of Classification Search
CPC ............ G06F 16/3347; G06F 16/3344; G06F 16/332; G06F 16/24542; G06F 16/2455;
(Continued)

(56) References Cited

U.S. PATENT DOCUMENTS 9,531,722 B1 * 12/2016 York ..................... G06F 21/629
10,083,578 B2 * 9/2018 Gervais ................... G08B 6/00
(Continued)

FOREIGN PATENT DOCUMENTS

| CN | 103383701 A | 11/2013 |
| CN | 109933708 A | 6/2019 |
| CN | 116719954 B | 9/2023 |

*Primary Examiner* — Mohammad A Sana
(74) *Attorney, Agent, or Firm* — Astute IP Law Group

(57) ABSTRACT

According to embodiments of the disclosure, a method, an apparatus, a device and a storage medium for information retrieval are provided. In the method, input content for indicating a retrieval requirement is obtained from a target object; a set of retrieval elements are determined based on the input content, the set of retrieval elements comprising at least action elements for describing an event associated with a business object to be retrieved; and a set of retrieval results for the retrieval requirement are provided based on the set of retrieval elements and historical interaction information, the historical interaction information being generated based on a set of interaction events for at least one business component. Thereby, the embodiments of the disclosure can support natural language search of the business object by the user by utilizing the historical interaction information between the user and the business component.

19 Claims, 5 Drawing Sheets

(58) Field of Classification Search
CPC ........... G06F 16/24522; G06F 16/2456; G06F 16/2465; G06F 16/2471; G06F 16/24575; G06F 16/2453; G06F 16/2457; G06F 16/215; G06F 16/243; G06F 16/244; G06F 16/245; G06F 16/248; G06F 16/93; G06F 16/285; G06F 16/9535; G06F 16/3329; G06F 16/90332; G06F 16/90335; G06F 16/217; G06F 16/353; G06F 40/289; G06F 40/10; G06F 40/40; G06F 40/30; G06F 40/205; G06F 40/105; G06F 40/106; G06F 40/186; G06F 40/211

See application file for complete search history.

(56) References Cited

U.S. PATENT DOCUMENTS

| | | | |
|---|---|---|---|
| 2015/0052121 A1* | 2/2015 | Sharifi | G06F 16/435 |
| | | | 707/723 |
| 2021/0042355 A1* | 2/2021 | Su | G06F 16/90335 |
| 2022/0300546 A1* | 9/2022 | Wang | G06F 40/30 |

* cited by examiner

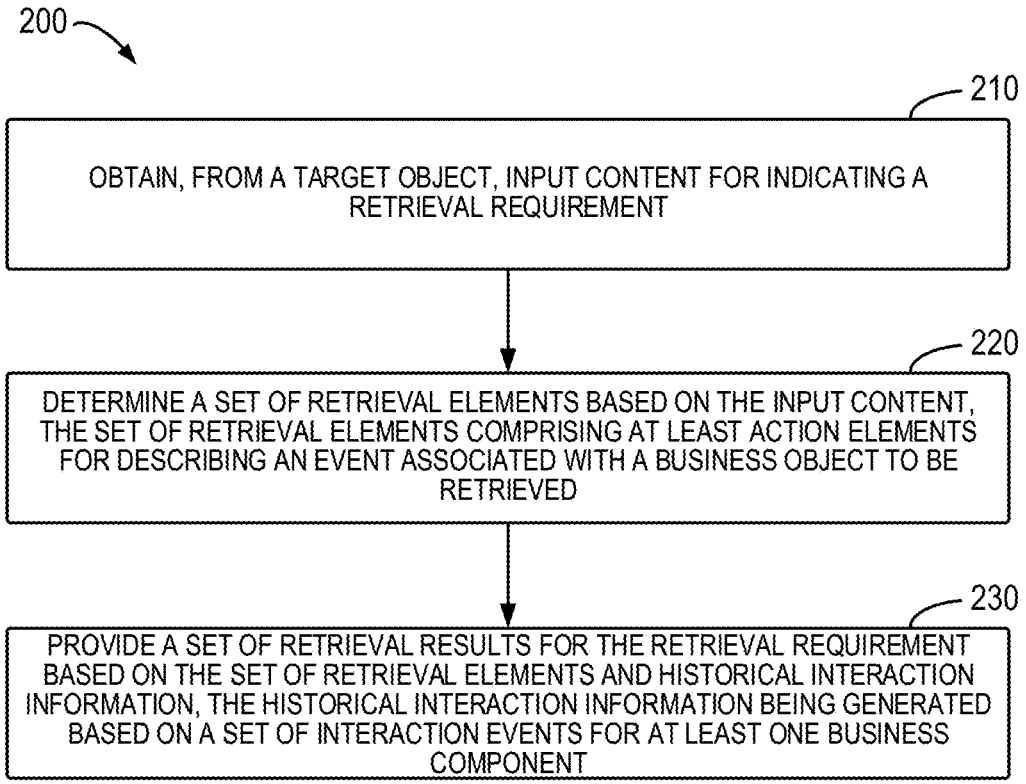

200

210

OBTAIN, FROM A TARGET OBJECT, INPUT CONTENT FOR INDICATING A
RETRIEVAL REQUIREMENT

220

DETERMINE A SET OF RETRIEVAL ELEMENTS BASED ON THE INPUT CONTENT,
THE SET OF RETRIEVAL ELEMENTS COMPRISING AT LEAST ACTION ELEMENTS
FOR DESCRIBING AN EVENT ASSOCIATED WITH A BUSINESS OBJECT TO BE
RETRIEVED

230

PROVIDE A SET OF RETRIEVAL RESULTS FOR THE RETRIEVAL REQUIREMENT
BASED ON THE SET OF RETRIEVAL ELEMENTS AND HISTORICAL INTERACTION
INFORMATION, THE HISTORICAL INTERACTION INFORMATION BEING GENERATED
BASED ON A SET OF INTERACTION EVENTS FOR AT LEAST ONE BUSINESS
COMPONENT

PROCESSING UNIT — 610

STORAGE DEVICE — 630

MEMORY — 620

625

PROGRAM PRODUCT

COMMUNICATION UNIT — 640

INPUT DEVICE — 650

OUTPUT DEVICE — 660

METHOD, APPARATUS, DEVICE AND STORAGE MEDIUM FOR INFORMATION RETRIEVAL

CROSS REFERENCE

The application claims priority to Chinese Patent Application No. 202311559495.7, filed on Nov. 21, 2023, and entitled "METHOD, APPARATUS, DEVICE AND STORAGE MEDIUM FOR INFORMATION RETRIEVAL", the entirety of which is incorporated herein by reference.

FIELD

Example embodiments of the disclosure generally relate to the field of computers, and in particular, to a method, an apparatus, a device and a computer-readable storage medium for information retrieval.

BACKGROUND

With the rapid development of Internet technologies, Internet has become an important platform for people to obtain content and share content, and users can access Internet through terminal devices to share various Internet services. Internet platforms can also provide users with capabilities related to various types of information retrieval. How to improve the efficiency of such information retrieval has become a focus of attention.

SUMMARY

In a first aspect of the disclosure, a method of information retrieval is provided. The method comprises: obtaining, from a target object, input content for indicating a retrieval requirement; determining a set of retrieval elements based on the input content, the set of retrieval elements comprising at least action elements for describing an event associated with a business object to be retrieved; and providing a set of retrieval results for the retrieval requirement based on the set of retrieval elements and historical interaction information, the historical interaction information being generated based on a set of interaction events for at least one business component.

In a second aspect of the disclosure, an apparatus for information retrieval is provided. The apparatus comprises: a content obtaining module configured to obtain, from a target object, input content for indicating a retrieval requirement; an element determining module configured to determine a set of retrieval elements based on the input content, the set of retrieval elements comprising at least action elements for describing an event associated with a business object to be retrieved; and a result providing module configured to provide a set of retrieval results for the retrieval requirement based on the set of retrieval elements and historical interaction information associated with at least one target object, the historical interaction information being generated based on a set of interaction events for at least one business component.

In a third aspect of the disclosure, an electronic device is provided. The device comprises: at least one processing unit; and at least one memory coupled to the at least one processing unit and storing instructions for execution by the at least one processing unit. The instructions, when executed by the at least one processing unit, cause the device to perform the method according to the first aspect.

In a fourth aspect of the disclosure, a computer-readable storage medium is provided. The computer-readable storage medium stores a computer program, and the computer program is executable by a processor to implement the method according to the first aspect.

It should be understood that content described in this content section is not intended to limit key features or important features of embodiments of the disclosure, nor is it intended to limit the scope of the disclosure. Other features of the disclosure will be readily understood from the following description.

BRIEF DESCRIPTION OF DRAWINGS

The above and other features, advantages and aspects of embodiments of the disclosure will become more apparent with reference to the following detailed description taken in conjunction with the accompanying drawings. In the drawings, the same or similar reference numerals represent the same or similar elements, wherein:

FIG. 2 illustrates a flowchart of a method for information retrieval according to some embodiments of the disclosure;

DETAILED DESCRIPTION

Figure 1:
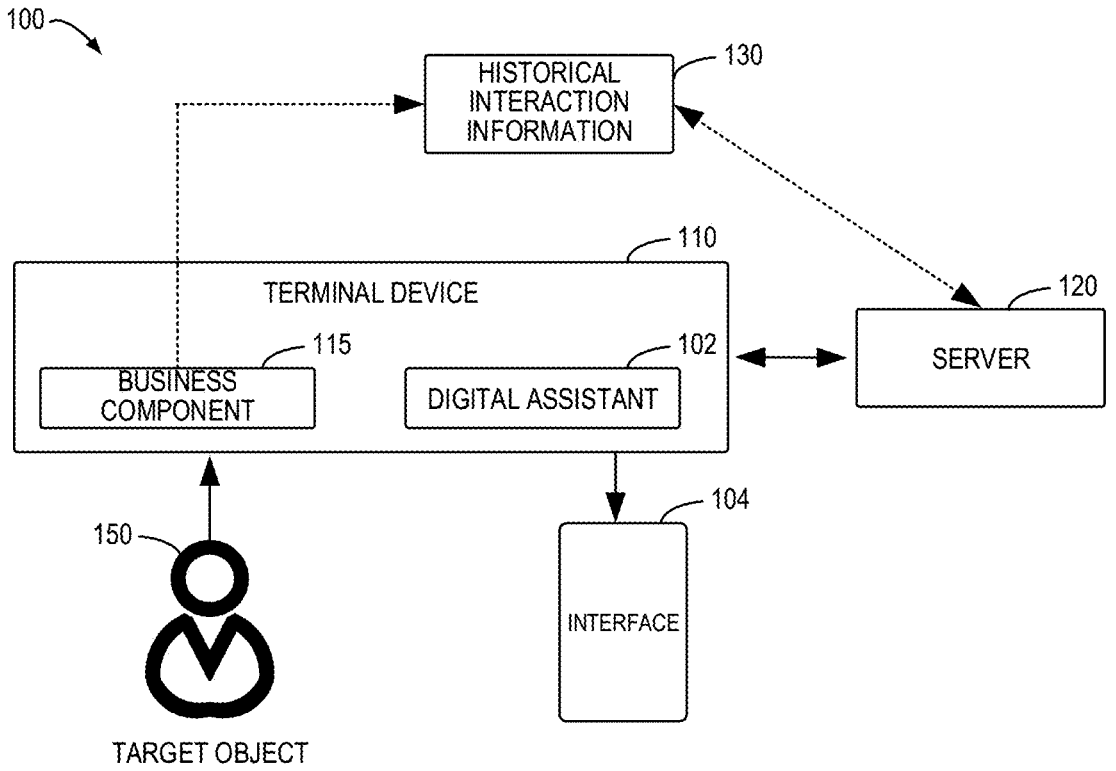
FIG. 1 illustrates a schematic diagram of an example environment in which embodiments of the disclosure can be implemented.

It may be understood that, before the technical solutions disclosed in the embodiments of the disclosure are used, the related users should be notified of the types, use ranges, use scenes, and the like of the information involved in the disclosure and authorized by the related users in an appropriate manner according to related laws and regulations. The related users may include any type of rights bodies, such as individuals, businesses, and groups.

For example, in response to receiving an active request from a user, prompt information is sent to the related user to explicitly prompt the related user that the requested operation to be performed would require acquisition and use of information of the related user. Therefore, the related user can autonomously select whether to provide information to software or hardware such as an electronic device, an application, a server, or a storage medium that performs the operations of the technical solution of the disclosure, according to the prompt information.

As an optional but non-limiting implementation, in response to receiving an active request from a related user, a manner of sending prompt information to the related user may be, for example, a pop-up window, and the pop-up window may present the prompt information in a text manner. In addition, the pop-up window may further carry a selection control for the user to select "agree" or "disagree" to provide personal information to the electronic device.

It may be understood that the foregoing process of notifying and acquiring user authorization is merely illustrative, and does not constitute a limitation on the implementations of the disclosure, and other manners that meet related laws and regulations may also be applied to the implementations of the disclosure.

It may be understood that, when the technical solution is used, related data (including but not limited to data itself, acquisition, use, storage, and transmission of data) should follow the requirements of the corresponding laws and regulations and related rules.

The term "in response to" as used herein means a state in which a respective event occurs or condition is satisfied. It will be appreciated that the timing of execution of a subsequent action performed in response to the event or condition is not necessarily strongly correlated with the time at which the event occurs or the condition holds. For example, in some cases, subsequent actions may be performed immediately when the event occurs or the condition holds; while in other cases, subsequent actions may be performed after a period of time elapses after the event occurs or the condition holds.

Embodiments of the disclosure will be described in more detail below with reference to the accompanying drawings. While certain embodiments of the disclosure are illustrated in the drawings, it should be understood that the disclosure may be embodied in various forms and should not be construed as limited to the embodiments set forth herein, but rather, these embodiments are provided to provide a more thorough and complete understanding of the disclosure. It should be understood that the drawings and embodiments of the disclosure are only used for example, and are not intended to limit the protection scope of the disclosure.

Note that the headings of any of the sections/subsections provided herein are not limiting. Various embodiments are described herein throughout, and any type of embodiment may be included under any section/subsection. Further, the embodiments described in any section/subsection may be combined in any manner with any other embodiments described in the same section/subsection and/or different sections/sections.

In the description of the embodiments of the disclosure, the terms "comprising". "including" and the like should be understood to open-ended, i.e., "including but not limited to". The term "based on" should be understood to be "based at least in part on". The terms "one embodiment" or "the embodiment" should be understood as "at least one embodiment". The term "some embodiments" should be understood as "at least some embodiments". Other explicit and implicit definitions may also be included below. The terms "first," "second," etc. may refer to different or identical objects. Other explicit and implicit definitions may also be included below.

As used herein, the term "model" may learn associations between respective inputs and outputs from training data so that corresponding outputs may be generated for a given input after training is completed. The generation and use of models may be based on technologies allowed by laws and regulations such as machine learning, which are simply available technologies. For example, deep learning is a machine learning algorithm that processes inputs and provides corresponding outputs by using a multi-layer processing unit. A "model" may also be referred to herein as a "machine learning model," a "machine learning network," or a "network," these terms are used interchangeably herein. A model may in turn include different types of processing units or networks.

As mentioned briefly above, various types of information retrieval tools have been utilized to improve the efficiency of information retrieval. However, conventional information retrieval tools usually find matched retrieval results for users based on filtering and matching of keywords, and such information retrieval tools are difficult to support the needs of users for natural language retrieval.

Embodiments of the disclosure provide a method for information retrieval. Specifically, input content for indicating a retrieval requirement may be obtained from a target object (e.g., a user, an organization, a team, etc.). Further, a set of retrieval elements may be determined based on the input content, the set of retrieval elements including at least action elements for describing an event associated with a business object to be retrieved. Further, a set of retrieval results for retrieval requirements may be provided based on the set of retrieval elements, historical interaction information being generated based on a set of interaction events for at least one business component.

Therefore, the embodiments of the disclosure can support natural language search of the user for the business object by utilizing the historical interaction information between the user and the business component.

Example embodiments of the disclosure will be described below with reference to the accompanying drawings.

EXAMPLE ENVIRONMENT

FIG. 1 illustrates a schematic diagram of an example environment 100 in which embodiments of the disclosure can be implemented. As shown in FIG. 1, in the environment 100, a terminal device 110 may be utilized to provide a digital assistant 102 for a target object 150. Such target objects may include users or organizations, etc., where the organizations may be businesses, groups, departments, etc.

In an example, such digital assistant 102 may also be referred to as a digital assistant, or a digital bot. It should be understood that although the digital assistant 102 is shown to be included in the terminal device 110 in FIG. 1, the partial processing capability of the digital assistant 102 may also be based at least in part on a server 120, for example. For example, a front-end portion (e.g., a portion for presentation) of the digital assistant 102 may be included in the terminal device 110, but a back-end portion (e.g., a portion for information retrieval) of the digital assistant 102 may be included in the server 120.

In some examples, the digital assistant 102 may be, for example, a digital assistant that assists the target object 150 in working, or may be in any other appropriate entity form. The digital assistant 102 may also run independently or be integrated into a particular application.

In some embodiments, the digital assistant 102 may be enabled, e.g., invoked or woken up, in an appropriate manner, e.g., via a shortcut, button, or voice. If the digital assistant 102 is active, the terminal device 110 may present an interface 104 associated with the digital assistant 102. The interface 104 may be a form of a conversational user interface (also referred to as a conversation interface or a conversation window), or may be any other appropriate interface form. As will be described in detail below; such an interface 104 may also include interface elements for information interaction, such as message input boxes, message lists, message bubbles, and the like. Through the interface 104, the digital assistant 102 may obtain information input by the target object 150.

Such input information may include, for example, any appropriate type of messages, such as a text message, a picture message, a voice message, a table message, a link message, other appropriate types of messages, and so forth.

Further, the server 120 may allow the target object 150 to interact with the digital assistant 102 to obtain information generated by the digital assistant 102. Alternatively, as will be described in detail below; when the target object 150 is authorized, the information generated by the digital assistant 102 may also be based on historical interactions between the target object 150 and at least one business component 115.

Such business components may include components capable of providing appropriate types of business services for the target object 150, examples of which may include, but are not limited to, office class components, tool class components, and the like. In some embodiments, such service components may be installed on the same terminal device 110. Alternatively, or additionally, such business components may also be installed on other terminal devices or provided in a form of a cloud service.

In some embodiments, such business components 115 may include a plurality of office components in an office suite. The office suite may be a set of office components developed to improve office efficiency, such as office components that create and edit documents, office components that create and edit tables, office components for drawing, and the like.

In some embodiments, the plurality of office components include several of the following: a chat component, a document component, an audio-video conference component, an email component, a calendar component, a schedule component, a task component, an Objectives and Key Results (OKR) component, and/or an appropriate office component that is currently existing or may be developed in the future.

In some embodiments, the digital assistant 102 may be a separate application different from the business component 115. Alternatively, the digital assistant 102 may also be a function or component appropriately integrated into business component 115.

In some embodiments, historical interaction information 130 may be maintained, as needed, at an appropriate electronic device such as the terminal device 110, the server 120, and/or other appropriate electronic devices. The historical interaction information 130 may include, for example, interaction information stored on the terminal device 110 or interaction information uploaded to the server 120.

As will be described in detail below, the historical interaction information 130 may be provided for processing information retrieval requests of the target object 150.

In some embodiments, the terminal device 110 communicates with the server 120 to implement provisioning of services of the digital assistant 102. The terminal device 110 may be any type of mobile terminals, fixed terminals, or portable terminals, including a mobile phone, a desktop computer, a laptop computer, a notebook computer, a netbook computer, a tablet computer, a media computer, a multimedia tablet, a personal communication systems (PCS) device, a personal navigation device, a personal digital assistant (PDA), an audio/video player, a digital camera/camcorder, a positioning device, a television receiver, a radio broadcast receiver, an e-book device, a gaming device, or any combination of the foregoing, including accessories and peripherals of these devices, or any combination thereof. In some embodiments, the terminal device 110 can also support any type of interfaces (such as a "wearable" circuit) for the target object 150. The server 120 may be various types of computing systems/servers that can provide computing capabilities, including but not limited to a mainframe, an edge computing node, a computing device in a cloud environment, and the like.

Although only one server 120 is shown in FIG. 1, the environment 100 may include a plurality of servers 120. For example, the historical interaction information 130 may be stored locally, or in a second server 120, as needed, and based on associated user authorization. It should be understood that the description herein is merely an example, and does not imply any limitation to the scope of the disclosure.

It should be understood that the structure and function of the environment 100 are described for example purposes only and do not imply any limitation on the scope of the disclosure.

EXAMPLE PROCESSES

FIG. 2 illustrates a flowchart of a process 200 for information retrieval according to some embodiments of the disclosure. The process 200 may be implemented by an appropriate electronic device or a combination of electronic devices (e.g., the server 120, the terminal device 110, or a combination of the server 120 and the terminal device 110 in FIG. 1). For case of description, in the following, the server 120 is used as an example, and the process 200 will be described with reference to FIG. 1.

As shown, at block 210, the server 120 obtains, from a target object, input content for indicating a retrieval requirement.

Figure 3:
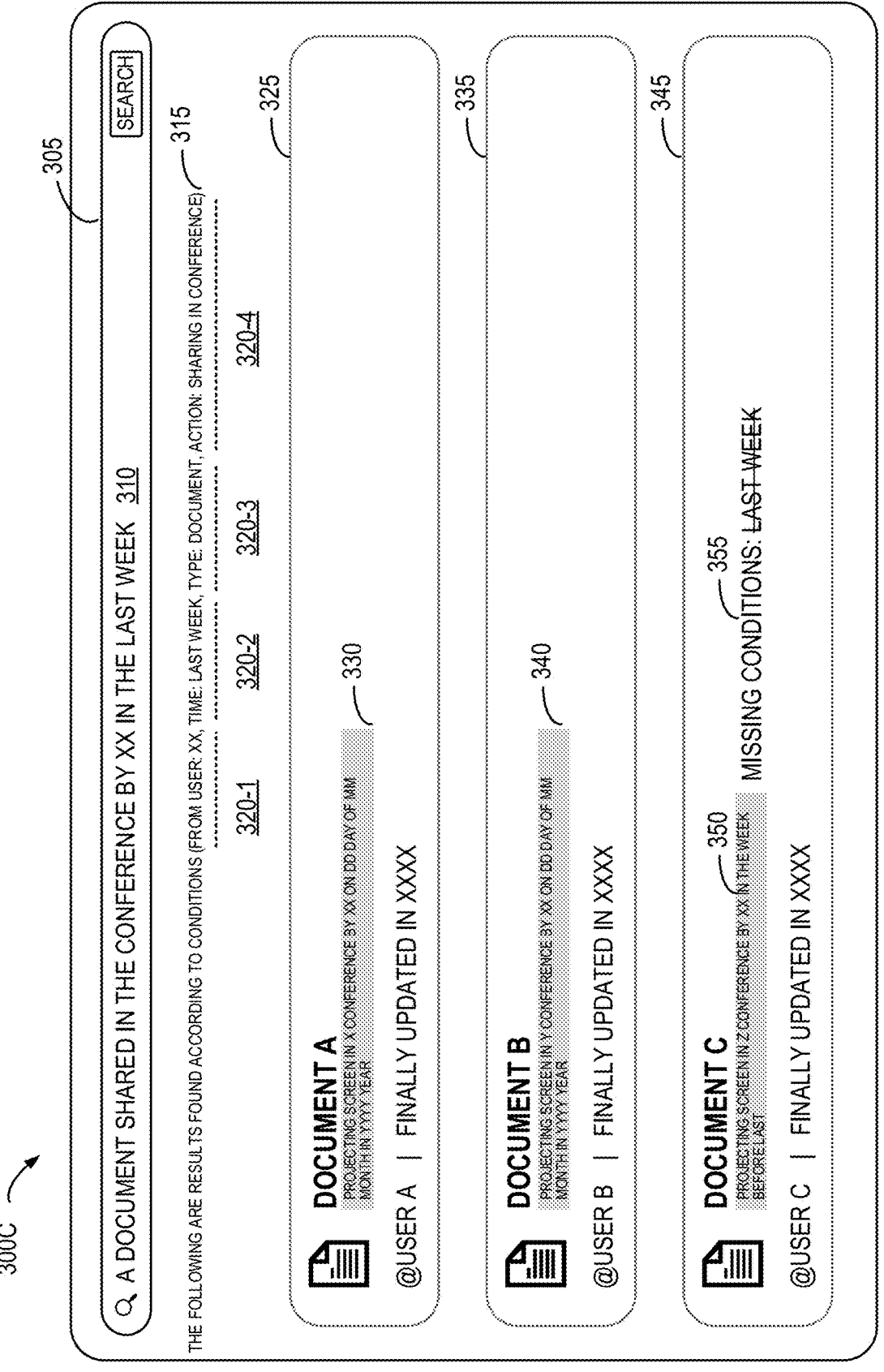
FIG. 3 illustrates an example interface according to some embodiments of the disclosure.

In some embodiments, the terminal device 110 may; for example, receive an input of the target object 150 in a retrieval control to obtain input content 310 indicating a retrieval requirement, and send the input content 310 to the server 120. As shown in FIG. 3, for example, the terminal device 110 may provide an interface 300 as shown for the target object 150.

The interface 300A may include a retrieval control 305 for receiving input. For example, the terminal device 110 may receive input content 310 input by the target object 150 by using the retrieval control 305. In an example, the target object 150 may, for example, directly enter input content 310, e.g., text content, within the retrieval control 305. Alternatively, for example, the target object 150 may input voice content, and the terminal device 110 transcribes the voice content into text content.

In some embodiments, for example, the terminal device 110 may receive the input content 310 for indicating the retrieval requirement in another appropriate manner, and send the input content 310 to the server 120. As an example, as discussed with reference to FIG. 1, the terminal device 110 may, for example, provide an interaction interface between the target object 150 (e.g., a user) and the digital assistant 102, and such interaction interface may, for example, display a conversation between the target object 150 and the digital assistant 102. Further, the terminal device 110 may obtain input content that is input by the target object 150 to the conversation and indicates the retrieval requirement.

For case of description, an example interface according to the disclosure will be described below by taking a retrieval control as an example. It should be understood that such features may also be used for scenes such as triggering information retrieval in a conversation.

With continued reference to FIG. 2, at block 220, the server 120 determines a set of retrieval elements based on the input content 310. The set of retrieval elements includes at least action elements for describing an event associated with a business object to be retrieved.

In some embodiments, prior to presenting the retrieval element 320, the server 120 may determine whether the input content 310 corresponds to a natural language search scene. Specifically, the server 120 may provide the input content 310 to a first model to determine whether the input content indicates a natural language search scene. If it is determined that the input content 310 indicates a natural language search scene, the server 120 may further determine a set of retrieval elements corresponding to the input content 310.

In an example, such a first model may be implemented based on an appropriate machine learning model for determining a search scene of the input content 310. For example, if the input content 310 is a simple keyword expression, the server 120 may not trigger parsing of the input content 310, for example. Conversely, if the input content 310 corresponds to a natural language search scene, the server 120 may trigger parsing one or more retrieval elements indicated in the input content 310.

In some embodiments, the server 120 may, for example, utilize a second model to parse one or more retrieval elements indicated in the input content 310. Specifically, the server 120 may provide the input content 310 to the second model, and obtain a set of retrieval elements determined by the second model based on the input content 310.

In some embodiments, the second model may be implemented based on a machine learning model to have the ability to extract retrieval elements from natural language expressions.

In some embodiments, the server 120 may, for example, construct a training sample for training the second model based on reference action elements and reference knowledge elements. As will be introduced below, for example, the server 120 may obtain the historical interaction information 130, and such historical interaction information 130 may include an action element for describing a historical interaction event and a knowledge element for describing a corresponding business object.

Further, the server 120 may use such action elements as reference action elements, and use such knowledge elements as reference knowledge elements to construct training query terms for training the second model. Specifically, for example, the server 120 may combine a specific reference action element and a corresponding reference knowledge element. As an example, such reference action element may include "a document written by XX on a certain day of a certain month in a certain year", and the reference knowledge element may include "topic A". Therefore, the server 120 may combine them to obtain an intermediate sample, that is, "a document of topic A written by XX on a certain day of a certain month in a certain year".

In some embodiments, considering that such a combination may not conform to an expression habit of the user, the server 120 may further process the intermediate sample by using a third model, for example, to obtain more training samples. In some embodiments, such a third model may include, for example, an appropriate machine learning model such as a language model, which may, for example, rewrite the intermediate samples into training samples in various expression styles.

In some embodiments, the server 120 may train the second model, for example, based on the training samples and the corresponding reference action elements, to enable the second model to have a capability to extract action elements from natural language text.

In some embodiments, in order to improve the generalization capability of the model, for example, the server 120 may further delete at least one limiting factor in the samples output by the third model to construct additional training samples. For example, the third model may, for example, output the sample "a document of topic A written by XX in the last week", and the server 120 may, for example, delete the time definition element and construct a new training sample "a document of topic A written by XX". Correspondingly, for example, the server 120 may train the second model based on the new training sample.

Taking FIG. 3 as an example, the server 120 may, for example, parse out a corresponding action element (e.g., an action: sharing in a conference) in the input content 310. For another example, if the input content 310 is "a document of topic A", the electronic device may, for example, determine that its corresponding knowledge element is "knowledge: topic A", and use it as one retrieval element.

In some embodiments, the set of retrieval elements may further include, for example, a user element associated with the business object to be retrieved. For example, taking FIG. 3 as an example, a retrieval element 320-1 may indicate the user information (e.g., user "XX") associated with the business object to be retrieved.

In some embodiments, the set of retrieval elements may further include, for example, a time element associated with the business object to be retrieved. For example, taking FIG. 3 as an example, a retrieval element 320-2 may indicate time information (e.g., "last week") associated with the business object to be retrieved.

In some embodiments, the set of retrieval elements may further include, for example, a type element of the business object to be retrieved. For example, taking FIG. 3 as an example, a retrieval element 320-3 may indicate type information (e.g., "document") of the business object to be retrieved.

In some embodiments, the server 120 may extract, for example, elements such as knowledge elements, user elements, time elements, type elements, etc., based on a syntactic analysis of the input content 310. Only as an example, the server 120 may determine an adverbial as "knowledge element", a subject as "user element", an object as "type element", and the like. It should be understood that, in some scenes, content of some retrieval elements may be empty. For example, the user may not indicate time information or the like in the input content 310.

Based on this manner, embodiments of the disclosure can complete the parsing of the retrieval element of the input content 310 for performing a natural language search process.

Figure 4:
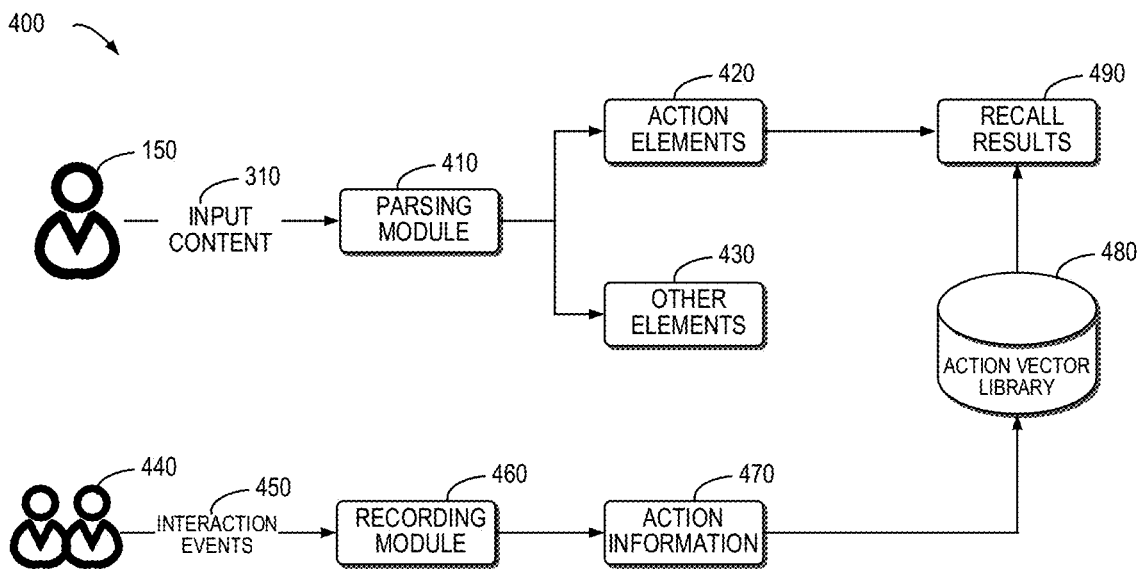
FIG. 4 illustrates an example retrieval process according to some embodiments of the disclosure.

In an example. FIG. 4 illustrates an example retrieval process 400 according to some embodiments of the disclosure. As shown in FIG. 4, a parsing module 410 may obtain the input content 310 from the target object 150, and may parse the input content 310 into one or more retrieval elements, for example, an action element 420 and/or other elements 430.

In some embodiments, to improve retrieval accuracy, the server 120 may further obtain association information of the target object 150 to assist in parsing the retrieval element. For example, some target objects 150 may express user elements by way of phonetic transcription, for example.

In some embodiments, for example, the server 120 may further obtain association information of the target object 150, where the association information indicates a set of associated objects associated with the target object. For example, the association information may indicate association degrees between the target object and other objects in the organization.

Further, the server 120 may determine a set of retrieval elements indicated by the input content based on the association information. For example, in the case where the input content 310 includes phonetic transcription, the server 120 may parse the phonetic transcription based on the association information. In some cases, the phonetic transcription may match a plurality of candidate objects in the organization, and correspondingly, the server 120 may determine another object having a higher association degree with the target object 150, as the "user element" corresponding to the phonetic transcription.

With continued reference to FIG. 2, at block 230, the server 120 provides a set of retrieval results for the retrieval requirement based on the set of retrieval elements and the historical interaction information 130. As discussed above, the historical interaction information 130 is generated based on a set of interaction events for the at least one business component 115.

The generation process of the historical interaction information 130 will be described below by taking the interaction event executed by the target object 150 as an example. In some embodiments, when the target object 150 interacts with the business component 115, the business component 115 may generate a log record and send the log record to a recording module. Further, the recording module may generate a corresponding record entry based on the received log record as the corresponding historical interaction information 130. In some embodiments, such record entries may include knowledge elements ("Knowledge") for describing business objects corresponding to historical interaction events.

In some embodiments, such business objects may include business objects generated, edited, referenced, shared, and the like by the target object 150 during interaction with the business component 115. Taking the business component 115 being a document component as an example, the historical interaction event may include a creation event of the target object 150 for a specific document in the document component, and correspondingly, the business object corresponding to the creation event for the document may include the specific document. For another example, taking the service component 115 being an audio-video conference component as an example, the historical interaction event may include an audio-video conference event in which the target object 150 participates, and correspondingly, the business object corresponding to the audio-video conference event may include an audio-video conference itself.

In some embodiments, the knowledge element may be a natural language description about the business object that is intended to abstract and/or compress the content of the business object. For example, using a document object as an example of a business object, the knowledge element may be used to describe a topic, a completion status, an audience, a language, an expression style, and the like of the document object. Taking an audio-video conference as an example of a business object, the knowledge element may be used to describe a topic, an agenda, a summary of conference content, and the like of the audio-video conference.

It should be understood that information in different dimensions may be selected based on different types of business objects, to generate a knowledge element used to describe the business object. For example, taking a conversation as an example of a business object, a knowledge element may be used to describe a type of the conversation (for example, whether the conversation is a single chat), a summary of content of the conversation, and the like.

Thus, by maintaining knowledge elements in record entries, embodiments of the disclosure may describe or characterize business objects involved in corresponding historical interaction events by using limited content length.

In some embodiments, the record entry may further include a time element for indicating an occurrence time of the historical interaction event. For example, continuing to take creating of a document as an example of a historical interaction event, such a time element may indicate a creation time of the document, for example.

In further embodiments, the record entry may further include an action element for indicating an event type of the historical interaction event. Continuing to take creating of a document as an example of a historical interaction event, such an action element may, for example, indicate that the type of the historical interaction event is a "create document" type.

It should be understood that the types of events may be appropriately divided according to scene requirements. Taking a document as an example of a business object, its corresponding type may include, for example, a production event (e.g., creation) of the document, a consumption event (e.g., browsing) of the document, a circulation event (e.g., sharing) of the document, and a management event (e.g., permission setting) of the document.

In some embodiments, the record entry may further include payload elements for indexing business objects corresponding to respective historical interaction events. Taking a document as an example of a business object, the payload elements may include, for example, a document number or a document identifier for indexing the document.

Therefore, in some scenes, after the target object 150 interacts with the business component 115, the recording module may generate a corresponding record entry. Such record entry may be represented as {time element, action element, knowledge element, payload element}, for example, to describe the historical interaction event in a plurality of predetermined dimensions.

As shown in FIG. 4, the server 140 may generate corresponding historical interaction information based on interaction events 450 between one or more target objects 440 and the at least one business component 115. Specifically, a recording module 460 may, for example, generate action information 470 for the interaction event 450. Such action information 470 may include, for example, action elements in the record entry introduced above. In some embodiments, such action elements may be described by natural language.

Further, the server 120 may construct a reference vector set based on the action elements in the historical interaction information 130. Such a reference vector set may, for example, correspond to text vectors of action elements represented with a natural language. Thus, such a reference vector set may be associated with a business object set to support searching for corresponding business objects through vector matching of action elements.

As shown in FIG. 4, the server 120 may construct an action vector library 480 (that is, a reference vector set) based on the action information 470, and may determine, based on matching between a target vector of the action element 420 and the action vector library 480, a recall result 490 i.e., matched action elements in the historical interaction information.

In some embodiments, the action information 470 in the historical interaction information may be associated with a set of candidate business objects (e.g., a plurality of documents). Thus, the server 120 may determine a corresponding matched business object (e.g., a matched document) from the set of candidate business objects based on the recall result 490, and may provide a matched business object as the retrieval result.

Specifically, the server 120 may determine one or more retrieval results matching the input content 310 based on matching between the target vector of the action element indicated in the input content 310 and the reference vector set (for example, a distance between vectors).

In some embodiments, the action vector library 480 for determining the recall result 490 may be constructed based on the historical interaction information 130 of the current target object 150. Alternatively, or additionally, the action vector library 480 for determining the recall result 490 may be constructed based on historical interaction information of one or more other target objects. For example, when the current target object 150 has the access permission of the specific business object, the server 120 may further obtain the action information 470 generated by other target objects about the historical interaction event of the business object, and add its corresponding vector to the action vector library 480 for recall. In this way, embodiments of the disclosure can allow a user to retrieve a specific business object by describing actions performed by other users with respect to the business object, e.g., "a document liked by XX in the conference."

Based on this manner, embodiments of the disclosure can allow the target object to express the retrieval requirement through a natural language, and can quickly locate the corresponding business object through matching of action elements.

As shown in FIG. 3, for example, the terminal device 110 may provide a retrieval result 325, a retrieval result 335, and a retrieval result 345 in the interface 300 (also referred to as a result page) as a response to a retrieval requirement. As shown in FIG. 3, the interface 300 may further include indication information 315 for indicating a set of retrieval elements 320 determined based on the input content 310.

Further, at least one of such retrieval results 325, 335, and 345 may be determined, for example, based on the set of retrieval elements 320 described by the indication information 315.

In some embodiments, the terminal device 110 may further display description information 330, description information 340, and description information 350, so as to intuitively present reasons why the corresponding retrieval results 325, 335 and 345 are determined to match the input content 310.

In some embodiments, as shown in FIG. 3, the retrieval result 345 may, for example, not match at least one retrieval element. Correspondingly, the terminal device 110 may also present matching information 355 in association with the retrieval result 345. The matching information 355 may indicate one or more elements of the set of retrieval elements 320 that do not match the retrieval result 345. Additionally, or alternatively, the matching information 355 may further list one or more elements of the set of retrieval elements 320 that match the retrieval result 345, for example.

In some embodiments, the set of retrieval results may further include at least one retrieval result matching a part of retrieval elements in the set of retrieval elements. In some embodiments, in the case that the retrieval result cannot be determined or the limited number of retrieval results are determined based on all the retrieval elements, the server 120 may further perform exact matching on not all the retrievals, for example.

Continuing to take FIG. 3 as an example, in some cases, due to a memory issue, the target object 150 may be inaccurate for the expression of the time element (e.g., the retrieval element 320-2). In some embodiments, for example, the server 120 may extend a retrieval range from the "last week" expressed by the time element to a time range of the previous month, and may search for business objects from the range that match other retrieval elements.

As an example, the retrieval result 345 may be determined based on a larger time range, for example. Correspondingly, the terminal device 110, for example, further presents the matching information 355 to indicate that the retrieval result 345 does not match the retrieval element 320-2 (i.e., the time element) indicated in the input content 310.

Based on this manner, the embodiments of the disclosure can further improve the retrieval efficiency of natural language retrieval.

In addition, it should be understood that although FIG. 3 describes a process of presenting retrieval elements and retrieval results in conjunction with a particular retrieval page, such a process is equally applicable to the retrieval triggered based on a conversation with a digital assistant, as described above.

EXAMPLE APPARATUS AND DEVICE

Figure 5:
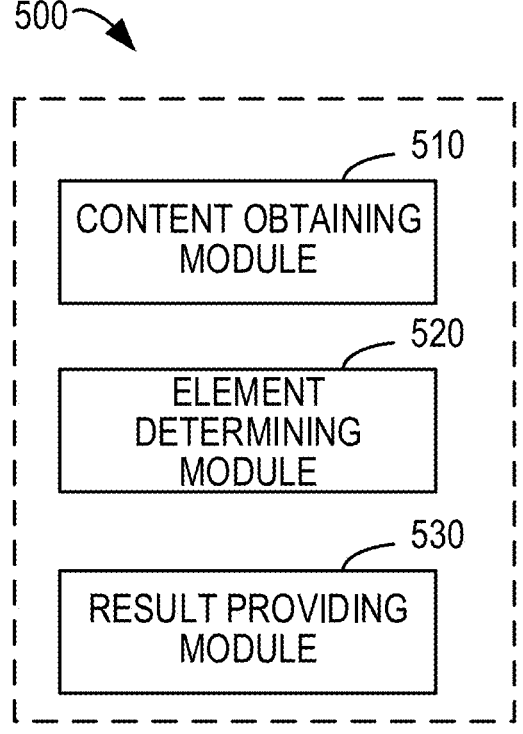
FIG. 5 illustrates a block diagram of an apparatus for information retrieval according to some embodiments of the disclosure.

FIG. 5 illustrates a schematic structural block diagram of an apparatus 500 for information retrieval according to some embodiments of the disclosure. The apparatus 500 may be implemented as or included in the server 120, the terminal device 110, or a combination of the server 120 and the terminal device 110 of FIG. 1. The various modules/components in the apparatus 500 may be implemented by hardware, software, firmware, or any combination thereof.

As shown in the figure, the apparatus 500 includes: a content obtaining module 510 configured to obtain, from a target object, input content for indicating a retrieval requirement; an element determining module 520 configured to determine a set of retrieval elements based on the input content, the set of retrieval elements comprising at least action elements for describing an event associated with a business object to be retrieved; and a result providing module 530 configured to provide a set of retrieval results for the retrieval requirement based on the set of retrieval elements and historical interaction information, the historical interaction information being generated based on a set of interaction events for at least one business component.

In some embodiments, the historical interaction information is associated with a set of candidate business objects, and the set of retrieval results comprises at least one business object determined from the set of candidate business objects.

In some embodiments, the target object is a first target object, and the set of interaction events are associated with the first target object and/or at least one second target object.

In some embodiments, the element determining module 520 is further configured to: provide the input content to a first model to determine whether the input content indicates a natural language search scene; and in response to determining that the input content indicates the natural language search scene, determine the set of retrieval elements based on the input content.

In some embodiments, the content obtaining module 510 is further configured to: obtain the input content of the target object received in a retrieval control; or obtain the input content input by the target object to the digital assistant in a conversation between the target object and the digital assistant.

In some embodiments, the set of retrieval elements further comprises at least one of: a knowledge element for describing content of the business object; a user element associated with the business object; a time element associated with the business object; a type element of the business object.

In some embodiments, the element determining module 520 is further configured to: provide the input content to a second model; and obtain the set of retrieval elements determined by the second model based on the input content.

In some embodiments, the second model is trained based on a process including: constructing a set of training samples based on a set of reference action elements and a set of reference knowledge elements; and training the second model based on the set of training samples and the set of reference action elements.

In some embodiments, constructing the set of training input samples based on the set of reference action elements and the set of reference knowledge elements comprises: generating an intermediate sample by combining a specific reference action element of the reference action elements and a corresponding reference knowledge element of the reference knowledge elements; and processing the intermediate sample by using a third model, to obtain at least one training sample corresponding to the specific reference action element.

In some embodiments, the at least one training sample comprises: a first training sample output by the third model; and/or a second training sample, the second training sample being generated by deleting at least one limiting element in the first training sample.

In some embodiments, the element determining module 520 is further configured to: obtain association information of the target object, the association information indicating a set of associated objects associated with the target object; and determine, based on the association information, the set of retrieval elements indicated by the input content.

In some embodiments, the result providing module 530 is further configured to: provide the set of retrieval results for the retrieval requirement based on target vectors of the action elements and a reference vector set associated with a business object set, the reference vector set being generated based on events associated with respective business objects, indicated by the historical interaction information.

In some embodiments, the result providing module 530 is further configured to: provide at least one retrieval result matching a part of retrieval elements in the set of retrieval elements.

In some embodiments, the result providing module 530 is further configured to: provide matching information to the target object to indicate that the at least one result mismatches at least one retrieval element in the set of retrieval elements.

In some embodiments, the apparatus 500 further includes a control module configured to: cause the set of retrieval results and the set of retrieval elements to be displayed in a result page, as a response to the retrieval requirement.

Figure 6:
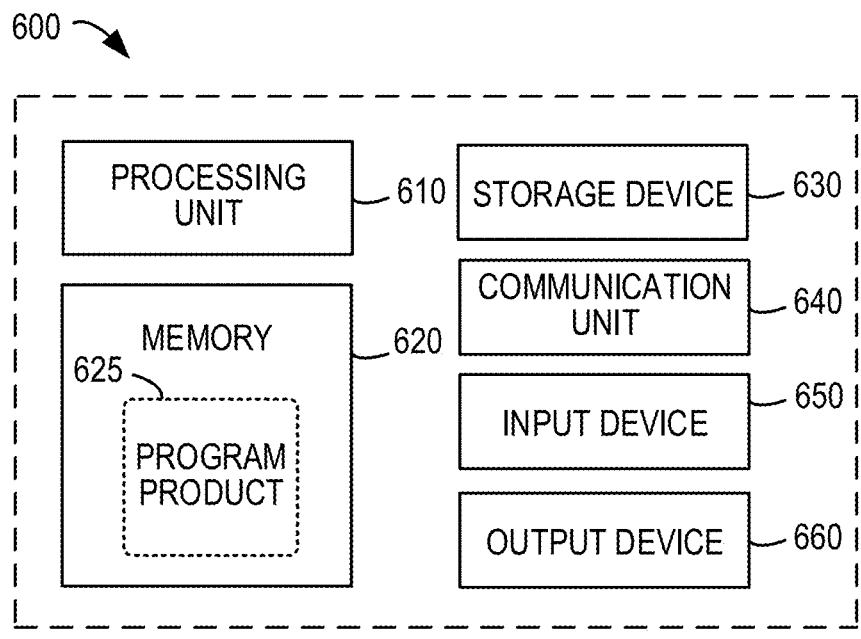
FIG. 6 illustrates a block diagram of a device capable of implementing various embodiments of the disclosure.

FIG. 6 illustrates a block diagram illustrating an electronic device 600 in which one or more embodiments of the disclosure may be implemented. It should be understood that the electronic device 600 shown in FIG. 6 is merely an example and should not constitute any limitation on the function and scope of the embodiments described herein. The electronic device 600 shown in FIG. 6 may be configured to implement the server 120, the terminal device 110, or a combination of the server 120 and the terminal device 110 in FIG. 1.

As shown in FIG. 6, the electronic device 600 is in the form of a general-purpose electronic device. Components of the electronic device 600 may include, but are not limited to, one or more processors or processing units 610, a memory 620, a storage device 630, one or more communication units 640, one or more input devices 650, and one or more output devices 660. The processing unit 610 may be an actual or virtual processor and capable of performing various processes according to programs stored in the memory 620. In multiprocessor systems, multiple processing units execute computer-executable instructions in parallel to improve parallel processing capabilities of electronic device 600.

The electronic device 600 typically includes a plurality of computer storage media. Such media may be any available media accessible by the electronic device 600, including, but not limited to, volatile and non-volatile media, removable and non-removable media. The memory 620 may be volatile memory (e.g., registers, caches, random access memory (RAM)), non-volatile memory (e.g., read-only memory (ROM), electrically erasable programmable read-only memory (EEPROM), flash memory), or some combination thereof. Storage device 630 may be a removable or non-removable medium and may include a machine-readable medium, such as a flash drive, magnetic disk, or any other medium, which may be capable of storing information and/or data and may be accessed within electronic device 600.

The electronic device 600 may further include additional removable/non-removable, volatile/non-volatile storage media. Although not shown in FIG. 6, a disk drive for reading or writing from a removable, nonvolatile magnetic disk (e.g., a "floppy disk") and an optical disk drive for reading or writing from a removable, nonvolatile optical disk may be provided. In these cases, each drive may be connected to a bus (not shown) by one or more data media interfaces. The memory 620 may include a computer program product 625 having one or more program modules configured to perform various methods or actions of various embodiments of the disclosure.

The communications unit 640 implements communications with other electronic devices over a communications medium. Additionally, the functionality of components of the electronic device 600 may be implemented in a single computing cluster or multiple computing machines capable of communicating over a communication connection. Thus, the electronic device 600 may operate in a networked environment using logical connections with one or more other servers, network personal computers (PCs), or another network node.

The input device 650 may be one or more input devices, such as a mouse, a keyboard, a trackball, or the like. The output device 660 may be one or more output devices, such as a display, a speaker, a printer, or the like. The electronic device 600 may also communicate with one or more external devices (not shown) through the communication unit 640 as needed, external devices such as storage devices, display devices, etc., communicate with one or more devices that enable a user to interact with the electronic device 600, or communicate with any device (e.g., a network card, a modem, etc.) that enables the electronic device 600 to communicate with one or more other electronic devices. Such communication may be performed via an input/output (I/O) interface (not shown).

According to example implementations of the disclosure, there is provided a computer-readable storage medium having computer-executable instructions stored thereon, wherein the computer-executable instructions are executed by a processor to implement the method described above. According to example implementations of the disclosure, a computer program product is further provided, the computer program product being tangibly stored on a non-transitory computer-readable medium and including computer-executable instructions, the computer-executable instructions being executed by a processor to implement the method described above.

Aspects of the disclosure are described herein with reference to flowcharts and/or block diagrams of methods, apparatuses, devices, and computer program products implemented in accordance with the disclosure. It should be understood that each block of the flowchart and/or block diagram, and combinations of blocks in the flowcharts and/or block diagrams, may be implemented by computer-readable program instructions.

These computer-readable program instructions may be provided to a processing unit of a general purpose computer, special purpose computer, or other programmable data processing apparatus to produce a machine, such that the instructions, when executed by a processing unit of a computer or other programmable data processing apparatus, produce apparatus to implement the functions/acts specified in the flowchart and/or block(s) in block diagram. These computer-readable program instructions may also be stored in a computer-readable storage medium that cause the computer, programmable data processing apparatus, and/or other devices to function in a particular manner, such that the computer-readable medium storing instructions includes an article of manufacture including instructions to implement aspects of the functions/acts specified in the flowchart and/or block(s) in block diagram.

The computer-readable program instructions may be loaded onto a computer, other programmable data processing apparatus, or other devices, such that a series of operational steps are performed on a computer, other programmable data processing apparatus, or other devices to produce a computer-implemented process such that the instructions executed on a computer, other programmable data processing apparatus, or other devices implement the functions/acts specified in the flowchart and/or block(s) in block diagram.

The flowchart and block diagrams in the figures show architecture, functionality, and operation of possible implementations of systems, methods, and computer program products according to various implementations of the disclosure. In this regard, each block in the flowchart or block diagram may represent a module, program segment, or portion of an instruction that includes one or more executable instructions for implementing the specified logical function. In some alternative implementations, the functions noted in the blocks may also occur in a different order than noted in the figures. For example, two consecutive blocks may actually be performed substantially in parallel, which may sometimes be performed in the reverse order, depending on the functionality involved. It is also noted that each block in the block diagrams and/or flowchart, as well as combinations of blocks in the block diagrams and/or flowchart, may be implemented with a dedicated hardware-based system that performs the specified functions or actions, or may be implemented in a combination of dedicated hardware and computer instructions.

Various implementations of the disclosure have been described above, which are exemplary, not exhaustive, and are not limited to the implementations disclosed. Many modifications and variations will be apparent to those of ordinary skill in the art without departing from the scope and spirit of the various implementations illustrated. The selection of the terms used herein is intended to best explain the principles of the implementations, the practical application, or improvements to the technology in the marketplace, or to enable others of ordinary skill in the art to understand the various implementations disclosed herein.

We claim:

1. A method of information retrieval comprises:
obtaining, from a requester, input content for indicating a retrieval requirement;
determining a set of retrieval elements based on the input content, wherein the set of retrieval elements comprises at least action elements for describing an event associated with a business object to be retrieved; and
providing a set of retrieval results for the retrieval requirement based on the set of retrieval elements and historical interaction information, wherein the historical interaction information is generated based on a set of interaction events for at least one business component, and the business object is an object within the at least one business component,
wherein providing the set of retrieval results for the retrieval requirement comprises:
providing the set of retrieval results for the retrieval requirement based on vectors of the action elements and a reference vector set associated with a business object set, wherein the reference vector set is generated based on events associated with respective business objects, indicated by the historical interaction information.

2. The method of claim 1, wherein the historical interaction information is associated with a set of candidate business objects, and the set of retrieval results comprises at least one business object determined from the set of candidate business objects.

3. The method of claim 1, wherein the requester is a first requester, and the set of interaction events are associated with the first requester and/or at least one second requester.

4. The method of claim 1, wherein determining the set of retrieval elements based on the input content comprises:
providing the input content to a first model to determine whether the input content indicates a natural language search scene; and
in response to determining that the input content indicates the natural language search scene, determining the set of retrieval elements based on the input content.

5. The method of claim 1, wherein obtaining the input content for indicating the retrieval requirement comprises:
obtaining the input content of the requester received in a retrieval control; or
obtaining the input content input by the requester to the digital assistant in a conversation between the requester and the digital assistant.

6. The method of claim 1, wherein the set of retrieval elements further comprises at least one of:
a knowledge element for describing content of the business object;
a user element associated with the business object;
a time element associated with the business object;
a type element of the business object.

7. The method of claim 1, wherein determining the set of retrieval elements based on the input content comprises:
providing the input content to a second model; and
obtaining the set of retrieval elements determined by the second model based on the input content.

8. The method of claim 7, wherein the second model is trained based on a process comprising:
constructing a set of training samples based on a set of reference action elements and a set of reference knowledge elements; and training the second model based on the set of training samples and the set of reference action elements.

9. The method of claim 8, wherein constructing the set of training input samples based on the set of reference action elements and the set of reference knowledge elements comprises:

generating an intermediate sample by combining a specific reference action element of the reference action elements and a corresponding reference knowledge element of the reference knowledge elements; and processing the intermediate sample by using a third model, to obtain at least one training sample corresponding to the specific reference action element.

10. The method of claim 9, wherein the at least one training sample comprises:

a first training sample output by the third model; and/or a second training sample, the second training sample being generated by deleting at least one limiting element in the first training sample.

11. The method of claim 1, wherein determining the set of retrieval elements based on the input content comprises:

obtaining association information of the requester, the association information indicating a set of associated objects associated with the requester, and determining, based on the association information, the set of retrieval elements indicated by the input content.

12. The method of claim 1, wherein providing the set of retrieval results for the retrieval requirement comprises:

providing at least one retrieval result matching a part of retrieval elements in the set of retrieval elements.

13. The method of claim 12, further comprises:

providing matching information to the requester to indicate that the at least one result mismatches at least one retrieval element in the set of retrieval elements.

14. The method of claim 1, further comprises:

causing the set of retrieval results and the set of retrieval elements to be displayed in a result page, as a response to the retrieval requirement.

15. An electronic device comprises:

at least one processing unit; and at least one memory coupled to the at least one processing unit and storing instructions for execution by the at least one processing unit, the instructions, when executed by the at least one processing unit, causing the electronic device to perform acts comprising:

obtaining, from a requester, input content for indicating a retrieval requirement;

determining a set of retrieval elements based on the input content, wherein the set of retrieval elements comprises at least action elements for describing an event associated with a business object to be retrieved; and providing a set of retrieval results for the retrieval requirement based on the set of retrieval elements and historical interaction information, wherein the historical interaction information is generated based on a set of interaction events for at least one business component, and the business object is an object within the at least one business component, wherein providing the set of retrieval results for the retrieval requirement comprises:

providing the set of retrieval results for the retrieval requirement based on vectors of the action elements and a reference vector set associated with a business object set, wherein the reference vector set is generated based on events associated with respective business objects, indicated by the historical interaction information.

16. The electronic device of claim 15, wherein the historical interaction information is associated with a set of candidate business objects, and the set of retrieval results comprises at least one business object determined from the set of candidate business objects.

17. The electronic device of claim 15, wherein the requester is a first requester, and the set of interaction events are associated with the first requester and/or at least one second requester.

18. The electronic device of claim 15, wherein determining the set of retrieval elements based on the input content comprises:

providing the input content to a first model to determine whether the input content indicates a natural language search scene; and in response to determining that the input content indicates the natural language retrieval scene, determining the set of retrieval elements based on the input content.

19. A non-transitory computer-readable storage medium having stored thereon a computer program executable by a processor to implement acts comprising:

obtaining, from a requester, input content for indicating a retrieval requirement;

determining a set of retrieval elements based on the input content, wherein the set of retrieval elements comprises at least action elements for describing an event associated with a business object to be retrieved; and providing a set of retrieval results for the retrieval requirement based on the set of retrieval elements and historical interaction information, wherein the historical interaction information is generated based on a set of interaction events for at least one business component, and the business object is an object within the at least one business component, wherein providing the set of retrieval results for the retrieval requirement comprises:

providing the set of retrieval results for the retrieval requirement based on vectors of the action elements and a reference vector set associated with a business object set, wherein the reference vector set is generated based on events associated with respective business objects, indicated by the historical interaction information.

* * * * *